(12) United States Patent
Boochakorn et al.

(10) Patent No.: US 6,206,626 B1
(45) Date of Patent: *Mar. 27, 2001

(54) MECHANISM FOR TRANSFERRING INTEGRATED CIRCUIT PACKAGES FROM A SOURCE SITE TO A DESTINATION SITE WITH MINIMIZED MOVING PARTS

(75) Inventors: Sa-Nguan Boochakorn, Bangkok; Supachai Vesaruch, Pratumthanee; Kitinan Chanvivakul, Nonthaburi, all of (TH)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,179

(22) Filed: Sep. 30, 1999

(51) Int. Cl.[7] .............................. B65G 11/08; B65G 49/07
(52) U.S. Cl. .......................... 414/417; 414/811; 193/27; 198/493
(58) Field of Search .................... 414/417, 811; 198/493, 529, 546, 550.4; 124/56, 62; 193/27

(56) References Cited

U.S. PATENT DOCUMENTS

| | | | | |
|---|---|---|---|---|
| 72,924 | * | 12/1867 | Sinclair | 193/27 |
| 85,788 | * | 1/1869 | Bush | 124/62 |
| 565,151 | * | 8/1896 | Barlow-Massicks | 193/27 X |
| 1,383,318 | * | 7/1921 | McCormick | 193/27 X |
| 1,694,515 | * | 8/1928 | Nutting | 193/27 |
| 2,828,164 | * | 3/1958 | Spence | 193/27 X |
| 3,485,359 | * | 12/1969 | Nevitt | 193/27 X |
| 3,696,735 | * | 10/1972 | Boertje et al. | 193/27 X |
| 4,779,317 | * | 10/1988 | Barten | 198/493 X |
| 5,826,698 | * | 10/1998 | Sawada | 198/493 X |
| 5,988,355 | * | 11/1999 | Merour | 198/493 |

* cited by examiner

Primary Examiner—Robert P. Olszewski
Assistant Examiner—Gerald J. O'Connor
(74) Attorney, Agent, or Firm—Monica H. Choi

(57) ABSTRACT

A mechanism for transferring an integrated circuit package from a source site to a destination site with use of air to push the integrated circuit package to minimize use of moving parts. The integrated circuit package initially travels through an input passage when the integrated circuit package is placed into an input passage opening at the source site. In addition, an intermediate resting site is disposed at the end of the input passage. The integrated circuit package stops to rest at the intermediate resting site after traveling through the input passage. An output passage has an output passage opening at the intermediate resting site, and the integrated circuit package travels through the output passage to reach the destination site at the end of the output passage. An air nozzle is disposed at the intermediate resting site such that air from the air nozzle is blown onto the integrated circuit package when the integrated circuit package is at the intermediate resting site to push the integrated circuit package into the output passage opening. A detector may determine when the integrated circuit package is at the intermediate resting site such that the air nozzle automatically turns on to blow air onto the integrated circuit package when the detector determines that the integrated circuit passage is at the intermediate resting site.

13 Claims, 5 Drawing Sheets

MECHANISM FOR TRANSFERRING INTEGRATED CIRCUIT PACKAGES FROM A SOURCE SITE TO A DESTINATION SITE WITH MINIMIZED MOVING PARTS

TECHNICAL FIELD

The present invention relates generally to IC (Integrated Circuit) package handling systems, and more particularly, to a mechanism for transferring IC packages from a source site to a destination site with minimized moving parts to reduce bent leads on the IC packages.

BACKGROUND OF THE INVENTION

Referring to FIG. 1A, a typical IC (Integrated Circuit) package 102 includes a plurality of leads for coupling nodes of an IC die within the IC package 102 to a system external to the IC package 102. FIG. 1A shows a bottom view of the IC package 102. A first side 104 of the IC package 102 includes a first lead 106, a second lead 108, and a third lead 110. A second side 112 of the IC package 102 includes a fourth lead 114, a fifth lead 116, and a sixth lead 118. A third side 120 of the IC package 102 includes a seventh lead 122, an eighth lead 124, and a ninth lead 126. A fourth side 128 of the IC package 102 includes a tenth lead 130, an eleventh lead 132, and a twelfth lead 134. A typical IC package includes more numerous leads to a side of the IC package. However, three leads to a side of the IC package 102 are shown in FIG. 1A for clarity of illustration.

Referring to FIG. 1B, a side view of the first side 104 of the IC package 102 of FIG. 1A is shown. The side view of the first side 104 of the IC package 102 in FIG. 1B also shows a side view of the fourth lead 114 on the second side 112 of the IC package 102 and a side view of the twelfth lead 134 on the fourth side 128 of the IC package 102.

During manufacture of an IC package, the IC package is handled to move from a source site to a destination site within an assembly line for manufacture of the IC package. For example, an IC package may be at a source site for inspection of the IC package. Then, the IC package may be moved to a destination site for functional testing of the IC package.

Referring to FIG. 2, a prior art IC package handling system 200 includes a first passage 202, an intermediate passage 204, and a second passage 206 for transferring IC packages from a source site 208 to a destination site 209. An intermediate passage stopper 212 is disposed below the intermediate passage 204. An intermediate passage closer 213 maintains the intermediate passage 204 to be initially aligned with the first passage 202.

During operation of the prior art IC package handling system 200, an IC package 210 from the source site 208 is input into the first passage 202. The IC package 210 then travels through the first passage 202. The first passage 202 may be placed at an inclination such that the IC package 210 slides along a surface of the first passage 202 as illustrated in FIG. 2.

Referring to FIG. 3, the intermediate passage 204 is initially aligned with the first passage 202 such that the IC package moves into the intermediate passage 204 after traveling through the first passage 202. Elements having the same reference number in FIGS. 2 and 3 refer to elements having similar structure and function. The intermediate passage 204 includes a back stop wall 214 such that the IC package 210 stops to rest within the intermediate passage 204.

When the IC package 210 stops to rest within the intermediate passage 204, the intermediate passage closer 213 moves outward to control the intermediate passage 204 to swing downward towards the second passage 206. Referring to FIGS. 3 and 4, the intermediate passage 204 swings downward towards the second passage 206 to rest on the intermediate passage stopper 212. Elements having the same reference number in FIGS. 2, 3, and 4 refer to elements having similar structure and function. When the intermediate passage 204 rests on the intermediate passage stopper 212, the intermediate passage 204 is aligned with the second passage 206.

Referring to FIG. 5, the intermediate passage 204 and the second passage 206 are disposed at an inclination such that the IC package 210 then travels out of the intermediate passage 204 and through the second passage 206. Elements having the same reference number in FIGS. 2, 3, 4, and 5 refer to elements having similar structure and function. The IC package 210 eventually reaches the destination site 209. The intermediate passage 204 then swings back upward to be aligned with the first passage 202 for receiving another IC package that travels through the first passage 202 as illustrated in FIG. 2.

In the prior art IC package handling system 200, the intermediate passage 204 is a moving part that swings back and forth between being aligned with the first passage 202 (as illustrated in FIGS. 2 and 3) and the second passage 206 (as illustrated in FIGS. 4 and 5). Unfortunately, such constant movement of the intermediate passage 204 during production of a significantly large number of IC packages leads to rapid wear and tear of the parts of the intermediate passage 204.

Such wear and tear of the parts of the intermediate passage 204 results in malfunction of the intermediate passage 204 with down time during production of IC packages as an operator fixes the malfunctioning intermediate passage 204. In addition, with malfunction of the intermediate passage 204, the intermediate passage 204 may not align properly with the first passage 202 or the second passage 204. In that case, an IC package may acquire bent leads as the IC package travels through the intermediate passage 204 that is not aligned properly with the first passage 202 or the second passage 204. In addition, the IC package may become stuck within the prior art IC package handling system 200 when the intermediate passage 204 is not aligned properly with the first passage 202 or the second passage 204. When an operator fixes such an improperly aligned or malfunctioning intermediate passage 204, the IC package that is stuck within the prior art IC package handling system 200 may acquire bent leads.

Thus, a mechanism with minimum moving parts is desired for transferring IC packages from a source site to a destination site within an IC handling system to reduce the down time during production of IC packages and to minimize bent leads on the IC packages.

SUMMARY OF THE INVENTION

Accordingly, a general aspect of the present invention includes an apparatus and method for transferring an integrated circuit package from a source site to a destination site with use of air to push the integrated circuit package to minimize use of moving parts.

In an aspect of the present invention, an input passage has an input passage opening at the source site. The integrated circuit package travels through the input passage when the integrated circuit package is placed into the input passage opening at the source site. In addition, an intermediate resting site is disposed at the end of the input passage. The integrated circuit package stops to rest at the intermediate resting site after traveling through the input passage. An output passage has an output passage opening at the intermediate resting site, and the integrated circuit package travels through the output passage to reach the destination site at the end of the output passage. In a main aspect of the present invention, an air nozzle is disposed at the intermediate resting site such that air from the air nozzle is blown onto the integrated circuit package when the integrated circuit package is at the intermediate resting site to push the integrated circuit package into the output passage opening.

The present invention may also include a detector for determining when the integrated circuit package is at the intermediate resting site such that the air nozzle automatically turns on to blow air onto the integrated circuit package when the detector determines that the integrated circuit passage is at the intermediate resting site.

In this manner, by using air to push the IC package from the intermediate resting site into the output passage opening, the components for transferring the IC package from the source site to the destination site do not move in the present invention. Thus, even during production of a significantly high number of IC packages, such components are less prone to break down from wear and tear of such components, and the occurrence of bent leads on the IC packages is minimized.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1A, 1B, 2, 3, 4, 5, 6, 7, 8, and 9 refer to elements having similar structure and function.

DETAILED DESCRIPTION

Figure 1A:
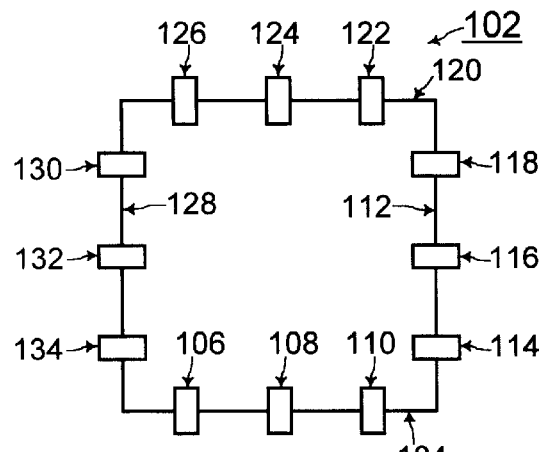
FIG. 1A shows a plurality of leads at the bottom of an example IC package.
Figure 1B:
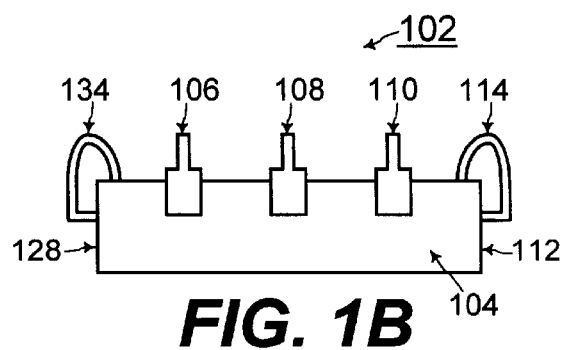
FIG. 1B shows a side view of the IC package of FIG. 1A.
Figure 2:
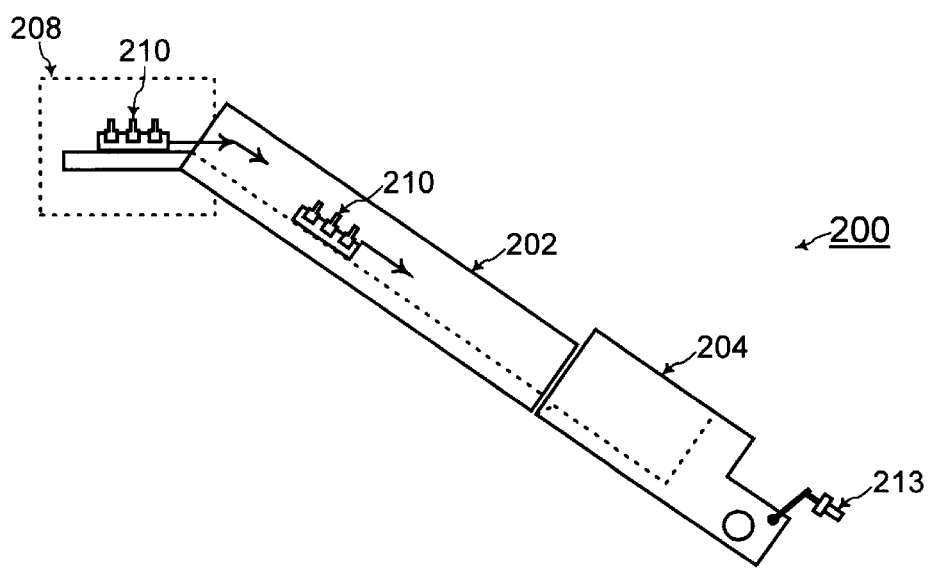
FIG. 2 shows components of a prior art IC package handling system for transferring an IC package from a source site to a destination site, wherein the IC package is traveling through a first passage from the source site.
Figure 2:
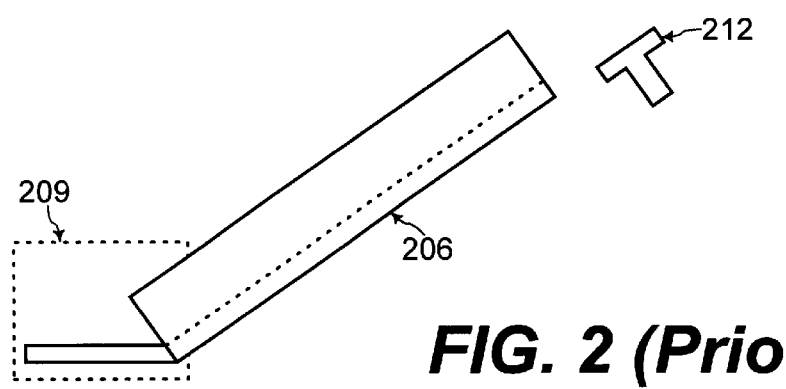
Figure 3:
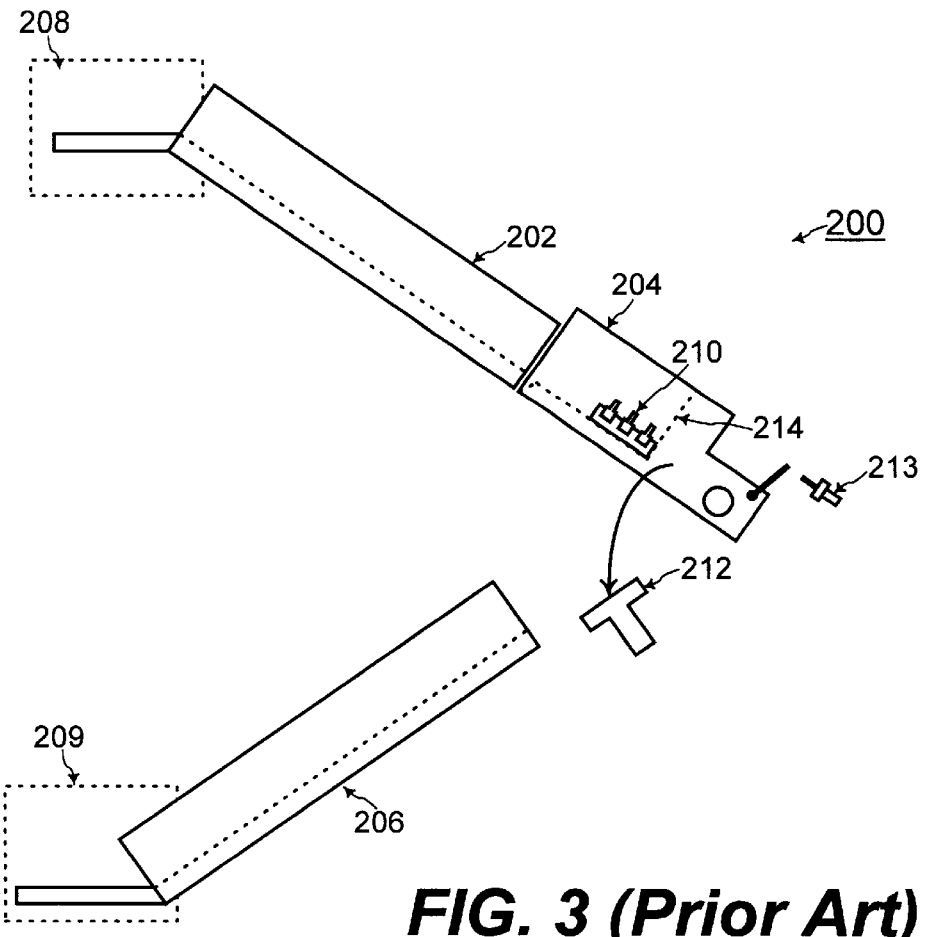
FIG. 3 shows the components of the prior art IC package handling system of FIG. 2, wherein the IC package stops to rest at an intermediate passage after traveling through the first passage.
Figure 4:
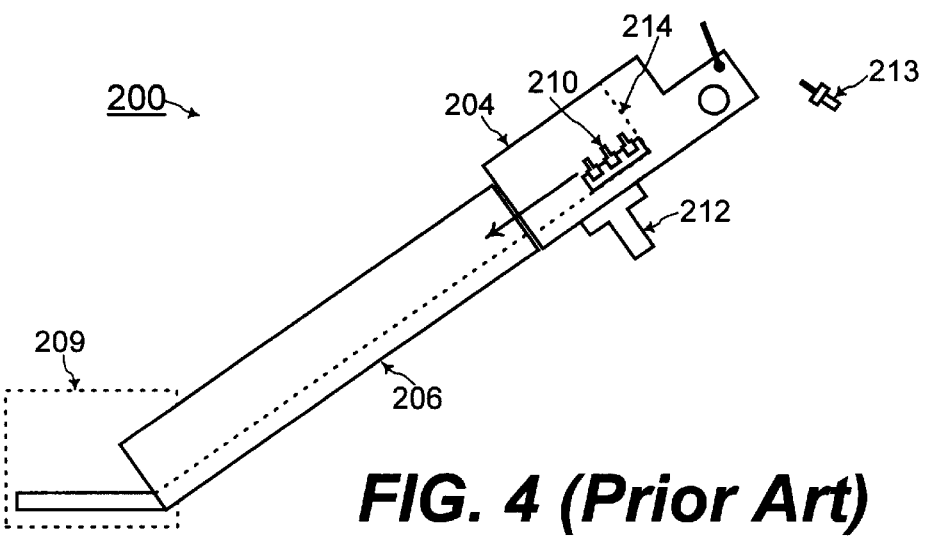
FIG. 4 shows the components of the prior art IC package handling system of FIG. 2, wherein the intermediate passage swings downward toward a second passage after the IC package stops to rest at the intermediate passage.
Figure 5:
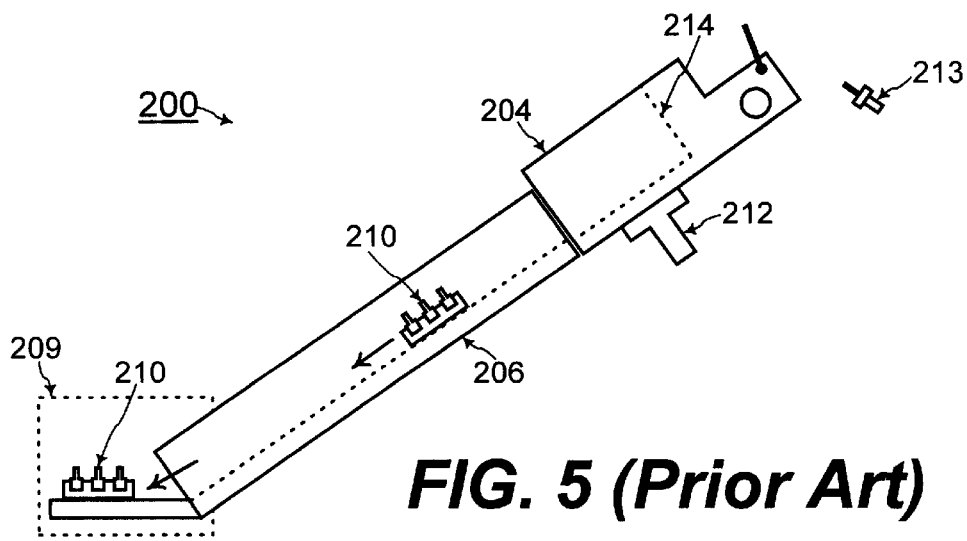
FIG. 5 shows the components of the prior art IC package handling system of FIG. 2, wherein the IC package is traveling through the second passage toward the destination site after the intermediate passage swings downward to be aligned with the second passage.
Figure 6:
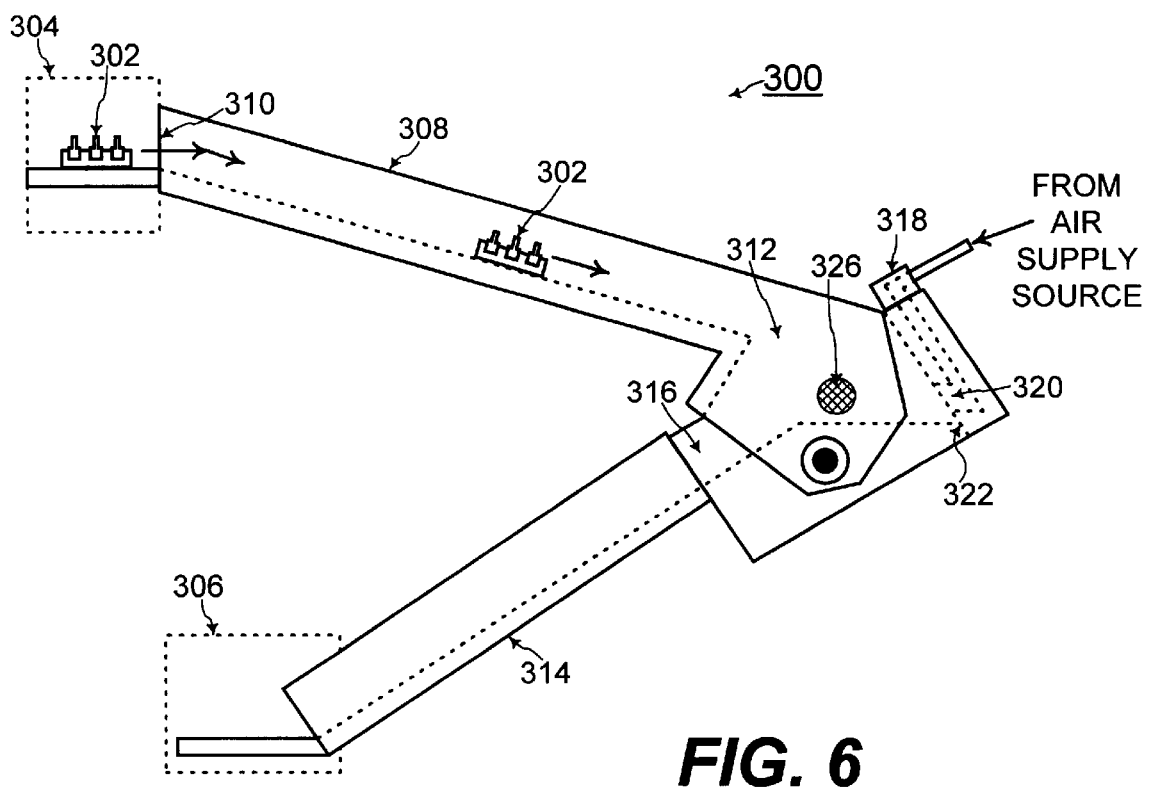
FIG. 6 shows an apparatus for transferring an integrated circuit package from a source site to a destination site with minimized moving parts, wherein the IC package is traveling through an input passage from the source site, according to an embodiment of the present invention.

Referring to FIG. 6, an apparatus 300 according to one embodiment of the present invention transfers an IC package 302 from a source site 304 to a destination site 306 with minimized use of moving parts. The apparatus 300 includes an input passage 308 having an input passage opening 310 at the source site 304. The apparatus 300 also includes an intermediate resting site 312 disposed at the end of the input passage 308. Furthermore, the apparatus 300 includes an output passage 314 having an output passage opening 316 at the intermediate resting site 312. The destination site 306 is at the end of the output passage 314.

Additionally, the apparatus 300 includes an air nozzle 318 disposed at the intermediate resting site 312. The air nozzle 318 is coupled to an air supply source and includes an air nozzle opening 320 at a back stop wall 322 of the intermediate resting site 312.

Referring to FIG. 6, during operation of the apparatus 300, the IC package 302 is input at the input passage opening 310 of the input passage 308. The IC package 302 then travels through the input passage 308. The input passage 308 may be disposed at an inclination as illustrated in FIG. 6 such that the IC package 302 slides down the input passage 308.

Figure 7:
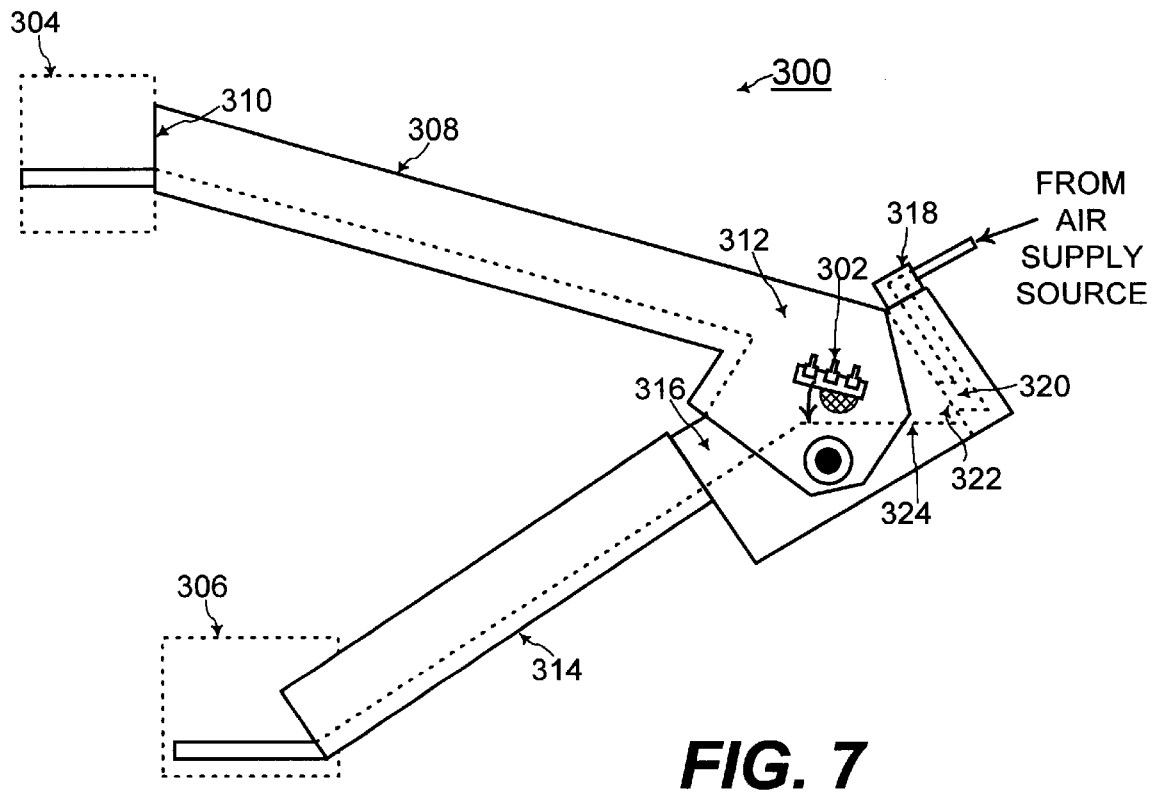
FIG. 7 shows the apparatus of FIG. 6, wherein the IC package reaches an intermediate resting site after traveling through the input passage, according to an embodiment of the present invention.
Figure 8:
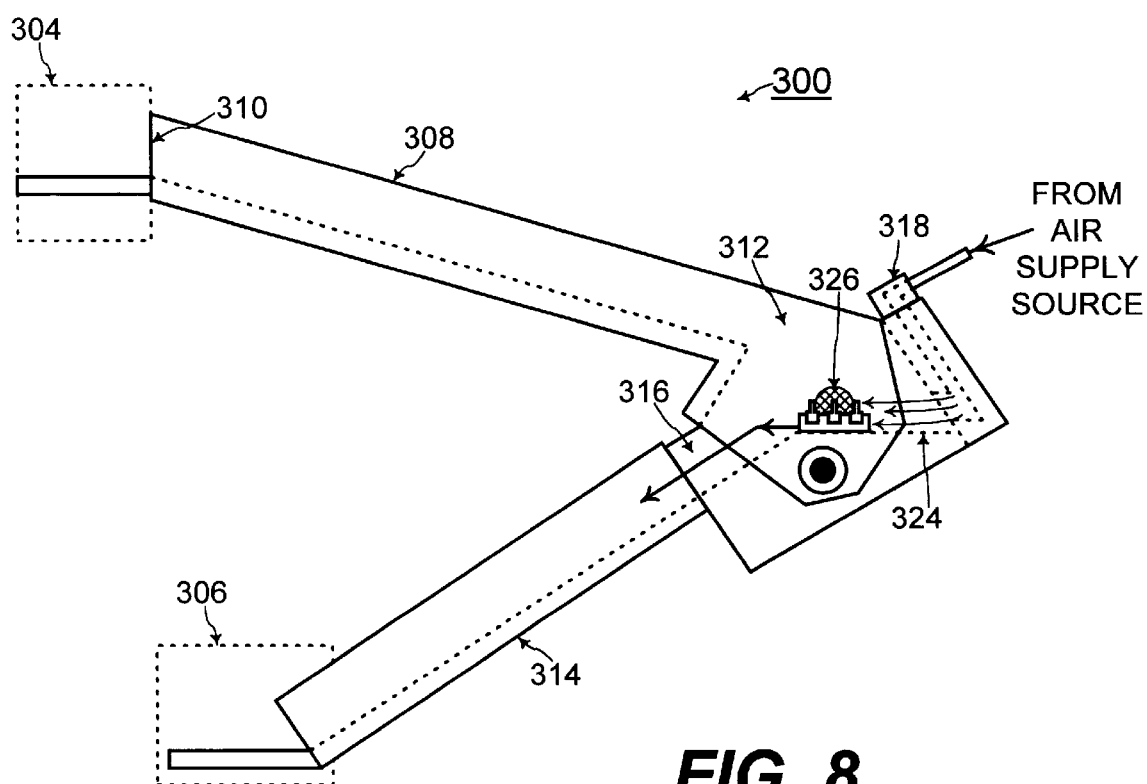
FIG. 8 shows the apparatus of FIG. 6, wherein air from an air nozzle pushes the IC package toward an output passage after the IC package stops to rest at the intermediate resting site, according to an embodiment of the present invention.

Referring to FIGS. 7 and 8, the IC package 302 reaches the intermediate resting site 312 at the end of the input passage 308. The IC package 302 stops to rest on a horizontal surface 324 at the intermediate resting site 312 after traveling through the input passage 308. The back stop wall 322 and the horizontal surface 324 at the intermediate resting site 312 cause the IC package 302 to stop to rest at the intermediate resting site 312.

Referring to FIG. 8, when the IC package 302 rests at the intermediate resting site 312, air is blown through the air nozzle opening 320 from the air nozzle 318. The air through the air nozzle opening 320 is blown on the IC package 302 when the IC package 302 is resting on the horizontal surface 324.

Figure 9:
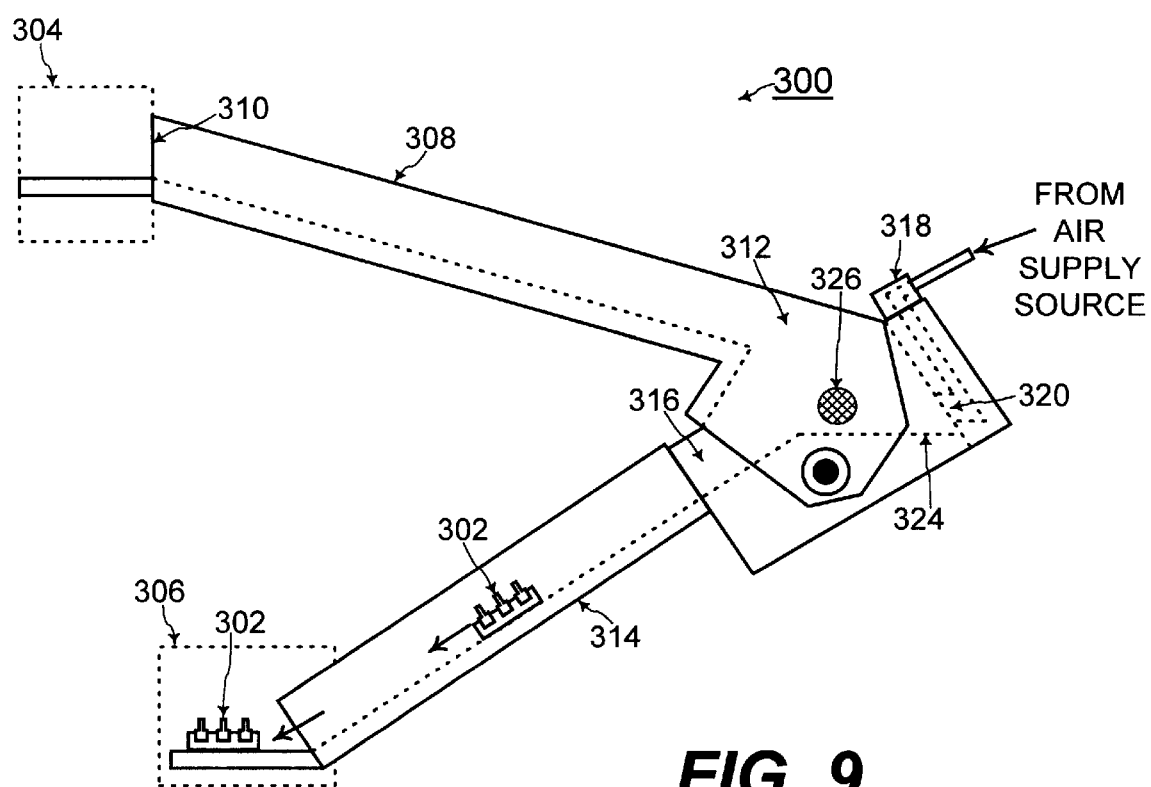
FIG. 9 shows the apparatus of FIG. 6, wherein the IC package is traveling through the output passage toward the destination site after being pushed into the output passage by the air from the air nozzle at the intermediate resting site, according to an embodiment of the present invention.

Such air pushes the IC package 302 into the output passage opening 316 of the output passage 314. Referring to FIG. 9, the IC package 302 then travels through the output passage 314 to reach the destination site 306 at the end of the output passage 314. The output passage 314 may be disposed at an inclination as illustrated in FIGS. 6, 7, 8, and 9 such that the IC package 302 slides down the output passage 314.

Referring to FIGS. 6, 7, 8, and 9, the IC package 302 travels through the input passage 310, the intermediate resting site 312, and the output passage 314 with the plurality of leads of the IC package 302 facing upward and away from any surface of the input passage 310, the intermediate resting site 312, and the output passage 314. Such a configuration minimizes contact of the plurality of leads with any such surfaces such that bent leads are minimized.

Referring to FIG. 8, an operator may manually apply the air onto the IC package 302 when the IC package 302 is resting on the horizontal surface 324 at the intermediate resting site 312. Alternatively, referring to FIGS. 6, 7, 8, and 9, a detector 326 may be disposed at the intermediate resting site 312 for automatically determining when the integrated circuit package 302 is resting on the horizontal surface 324 at the intermediate resting site 312. For example, the detector 326 may be an optical detector that detects when an object is present immediately in front of such an optical detector. When the detector 326 determines that the IC package 302 is resting on the horizontal surface 324 at the intermediate resting site 312, the air may automatically be applied on the IC package 302 through the air nozzle opening 320.

In this manner, because air is used to push the IC package 302 into the output opening 316, the apparatus 300 does not use any significantly moving parts, according to an embodiment of the present invention. Thus, even during production of a significantly high number of IC packages, the components of the apparatus 300 of the present invention have minimized wear and tear. With such minimized wear and tear, the components of the apparatus 300 of the present invention have minimized down time from break down during manufacture of IC packages. In addition, minimized malfunction and repair of the IC package handling system of the present invention leads to minimized bent leads on the IC packages.

The foregoing is by way of example only and is not intended to be limiting. For instance, the IC package 302 is by way of example only. A typical IC package 302 may have more numerous leads. In addition, the appearance of the input passage 302, the intermediate resting site 312, and the output passage 314 are by way of example only, and the present invention may be advantageously practiced with any other shape of the input passage 302, the intermediate resting site 312, and the output passage 314, as would be apparent to one of ordinary skill in the art from the description herein.

The present invention is limited only as defined in the following claims and equivalents thereof.

We claim:

1. An apparatus for transferring an integrated circuit package from a source site to a destination site disposed within an integrated circuit package manufacturing assembly, the apparatus comprising:

an input passage disposed within said integrated circuit package manufacturing assembly, and said input passage having an input passage opening at said source site, wherein said integrated circuit package travels through said input passage when said integrated circuit package is placed into said input passage opening at said source site;

and wherein said input passage has a first surface along which said integrated circuit package slides with leads of said integrated circuit package facing up and away from said first surface within said input passage;

an intermediate resting site disposed at an end of said input passage, wherein said integrated circuit package stops to rest on a second surface of said intermediate resting site with said leads of said integrated circuit package facing up and away from said second surface at said intermediate resting site after traveling through said input passage;

wherein said second surface of said intermediate resting site substantially does not move to prevent bent leads of said integrated circuit package;

an output passage disposed within said integrated circuit package manufacturing assembly, and said output passage having an output passage opening at said intermediate resting site, wherein said integrated circuit package travels through said output passage to reach said destination site at an end of said output passage;

and wherein said output passage has a third surface along which said integrated circuit package slides with said leads of said integrated circuit package facing up and away from said third surface within said output passage; and an air nozzle disposed at said intermediate resting site, wherein air from said air nozzle is blown onto said integrated circuit package when said integrated circuit package is at said intermediate resting site to push said integrated circuit package into said output passage opening.

2. The apparatus of claim 1, further comprising:

a detector for determining when said integrated circuit passage is stopped to rest on said second surface at said intermediate resting site, wherein said air nozzle turns on to blow air onto said integrated circuit package when said detector determines that said integrated circuit passage is stopped to rest on said second surface at said intermediate resting site.

3. The apparatus of claim 1, wherein said input passage is tilted at an inclination such that said integrated circuit package slides down along said first surface of said input passage.

4. The apparatus of claim 3, wherein said second surface of said intermediate resting site at the end of said input passage has a back stop wall such that said integrated circuit package stops to rest after said integrated circuit package slides down along said first surface of said input passage.

5. The apparatus of claim 1, wherein said output passage is tilted at an inclination such that said integrated circuit package slides down along said third surface of said output passage.

6. An apparatus for transferring an integrated circuit package from a source site to a destination site disposed within an integrated circuit package manufacturing assembly, the apparatus comprising:

an input passage disposed within said integrated circuit package manufacturing assembly, and said input passage having an input passage opening at said source site, wherein said integrated circuit package travels through said input passage when said integrated circuit package is placed into said input passage opening at said source site;

and wherein said input passage has a first surface along which said integrated circuit package slides with leads of said integrated circuit package facing up and away from said first surface within said input passage;

an intermediate resting site disposed at an end of said input passage, wherein said integrated circuit package stops to rest on a second surface of said intermediate resting site with said leads of said integrated circuit package facing up and away from said second surface at said intermediate resting site after traveling through said input passage;

wherein said second surface of said intermediate resting site substantially does not move to prevent bent leads of said integrated circuit package;

an output passage disposed within said integrated circuit package manufacturing assembly, and said output passage having an output passage opening at said intermediate resting site, wherein said integrated circuit package travels through said output passage to reach said destination site at an end of said output passage;

and wherein said output passage has a third surface along which said integrated circuit package slides with said leads of said integrated circuit package facing up and away from said third surface within said output passage; and means for pushing said integrated circuit package into said output passage opening by blowing air on said integrated circuit package when said integrated circuit package is at said intermediate resting site.

7. The apparatus of claim 5, further comprising:

means for automatically determining when said integrated circuit passage is stopped to rest on said second surface at said intermediate resting site.

8. A method for transferring an integrated circuit package from a source site to a destination site within an integrated circuit package manufacturing assembly, the method including the steps of:

A. placing said integrated circuit package into an input passage opening of an input passage within said integrated circuit package manufacturing assembly and at said source site with leads of said integrated circuit package facing up and away from a first surface along which said integrated circuit package slides when said integrated circuit package is placed into said input passage opening at said source site;

and wherein said integrated circuit package stops to rest on a second surface of an intermediate resting site disposed at an end of said input passage with said leads of said integrated circuit package facing up and away from said second surface at said intermediate resting site after traveling through said input passage;

B. automatically pushing said integrated circuit package from said intermediate resting site to an output passage opening of an output passage at said intermediate resting site by blowing air, from an air nozzle disposed at said intermediate resting site, onto said integrated circuit package when said integrated circuit package is at said intermediate resting site to push said integrated circuit package into said output passage opening, wherein said integrated circuit package travels through said output passage when placed into said output passage opening to reach said destination site at an end of said output passage;

and wherein said integrated circuit package is pushed to slide along a third surface within said output passage with said leads of said integrated circuit packages facing up and away from said third surface as said integrated circuit package travels within said output passage; and C. maintaining said second surface of said intermediate resting site to substantially not move to prevent bent leads of said integrated circuit package.

9. The method of claim 8, further including the step of:

automatically detecting when said integrated circuit passage is stopped to rest on said second surface at said intermediate resting site.

10. The method of claim 8, wherein said input passage is tilted at an inclination such that said integrated circuit package slides down along said first surface of said input passage.

11. The method of claim 10, wherein said second surface of said intermediate resting site at the end of said input passage has a back stop wall such that said integrated circuit package stops to rest on said second surface of said intermediate resting site after said integrated circuit package slides down said input passage.

12. The method of claim 8, wherein said output passage is tilted at an inclination such that said integrated circuit package slides down along said third surface of said output passage.

13. The method of claim 8, wherein said source site is disposed at a site for inspection of said integrated circuit package within said integrated circuit package manufacturing assembly and wherein said destination site is disposed at a site for testing functionality of said integrated circuit package within said integrated circuit package manufacturing assembly.

* * * * *